(12) United States Patent
Lush

(10) Patent No.: US 7,185,605 B1
(45) Date of Patent: Mar. 6, 2007

(54) MULTI-TIER COLLAPSIBLE FEEDER

(76) Inventor: Raymon W. Lush, 410 Main St., Bloomfield, NE (US) 68718

( * ) Notice: Subject to any disclaimer, the term of this patent is extended or adjusted under 35 U.S.C. 154(b) by 0 days.

(21) Appl. No.: 11/480,607

(22) Filed: Jul. 3, 2006

(51) Int. Cl.
*A01K 5/00* (2006.01)

(52) U.S. Cl. .......................... 119/52.2; 119/52.1; 220/8

(58) Field of Classification Search .............. 119/52.2, 119/51.01, 61.5, 429, 430, 431, 207, 221, 119/222, 223, 224, 225; 220/8, 9.2, 9.3; D30/124
See application file for complete search history.

(56) References Cited

U.S. PATENT DOCUMENTS

| | | | | |
|---|---|---|---|---|
| 1,790,045 A | * | 1/1931 | Harvey | 119/52.1 |
| 2,845,895 A | * | 8/1958 | Balkauskas | 119/461 |
| 3,399,650 A | * | 9/1968 | Goodman | 119/51.03 |
| 3,677,230 A | * | 7/1972 | Braden | 119/51.04 |
| D249,285 S | * | 9/1978 | Podjan | D30/124 |
| 4,204,500 A | * | 5/1980 | Podjan | 119/57.8 |
| 4,978,021 A | * | 12/1990 | Mini et al. | 220/8 |
| D333,538 S | * | 2/1993 | Kingsley | D30/199 |
| 5,203,281 A | * | 4/1993 | Harwich | 119/57.9 |
| 5,862,932 A | * | 1/1999 | Walsh et al. | 220/8 |
| 5,975,015 A | * | 11/1999 | Runyon et al. | 119/52.1 |
| 6,047,661 A | * | 4/2000 | Lush | 119/51.01 |
| 6,070,554 A | * | 6/2000 | Wilson | 119/51.04 |
| 6,073,582 A | * | 6/2000 | Lush | 119/51.01 |
| 6,360,690 B1 | * | 3/2002 | Canby | 119/52.2 |
| 6,390,021 B1 | * | 5/2002 | Krenzel | 119/52.2 |
| 6,427,629 B1 | * | 8/2002 | Lush | 119/52.1 |
| 6,742,674 B2 | * | 6/2004 | Castleberry | 221/132 |
| 6,866,004 B1 | * | 3/2005 | Lush | 119/52.1 |
| 7,028,635 B1 | * | 4/2006 | Eastman, II | 119/51.11 |
| 7,032,538 B1 | * | 4/2006 | Lush | 119/52.1 |
| 2005/0120967 A1 | * | 6/2005 | Ruff | 119/52.2 |

* cited by examiner

Primary Examiner—Yvonne R. Abbott
(74) Attorney, Agent, or Firm—Thomte, Mazour & Niebergall; Dennis L. Thomte

(57) ABSTRACT

A multi-tier feeder which is comprised of a plurality of mesh feeder bodies stacked one upon the other in a collapsible fashion and which include even feed baffle plates positioned therein in a vertically spaced-apart relationship.

12 Claims, 5 Drawing Sheets

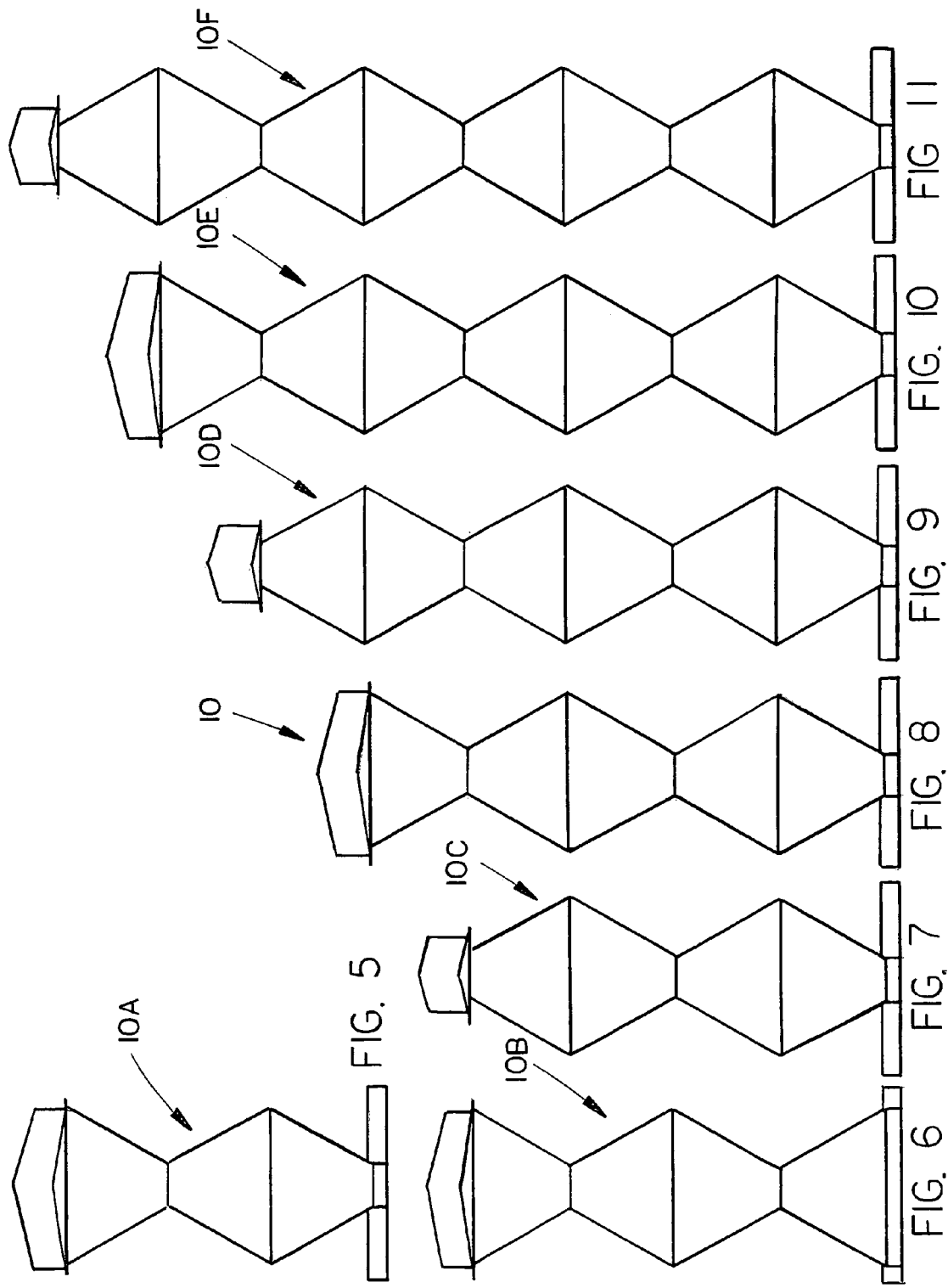

MULTI-TIER COLLAPSIBLE FEEDER

BACKGROUND OF THE INVENTION

1. Field of the Invention

This invention relates to a collapsible feeder and more particularly to a collapsible feeder for birds, squirrels and the like which is convenient to install, convenient for wild game to perch upon, and which is resistant to damage from squirrels and other feeding wildlife. More particularly, the invention disclosed herein relates to a multi-tier collapsible feeder.

2. Description of the Related Art

Selectively collapsible feeders are commonly used to hold seeds, suet and the like as food for wild animals such as birds, squirrels, etc. Many of the collapsible wild game feeders of the prior art are constructed from plastic polymer, natural fiber mesh or netting. Mesh or netting feeders have the advantage of not requiring a rod, dowel or other support for small birds, since the birds can perch on the mesh or net and feed at any exposed location on the feeder. Examples of mesh or net feeders of the prior art include the Thistle Pouch brand feeder manufactured by Havegard Farm, Inc. of Algoma, Wis., and Feather Friends E-Z Feeders brand wild bird feeder marketed by Canine's Choice of Marion, Ind. Other types of collapsible feeders are disclosed in U.S. Pat. Nos. 5,203,281; 4,706,851; and 4,026,244. Another type of collapsible wild game feeder is described in applicant's U.S. Pat. No. 5,479,881. The feeder of the '881 patent consists of a solid, weather-resistant bag fitted with openings at its base to allow attachment of rods for perching and access to the seed or other food contained in the bag.

Although many collapsible wild game feeders of the known art are convenient to install and highly attractive to wild game when they are first placed in use, none of the collapsible feeders of the known art are suitable for the feeding of squirrels or other large, aggressive feeding wildlife such as jays and monk parakeets. Squirrels and other large, aggressive feeding wildlife quickly tear the mesh of collapsible feeders of the known art and create holes through which the food spills from the feeder onto the ground below. Similarly, squirrels and large birds can easily enlarge the feeding openings or simply create new openings in the walls of the feeder of the '881 patent. After squirrels or large birds have damaged the net, webbing or walls of feeders of the known art, the food spills out and is no longer available to attract wildlife to the feeder. Further, the spilled feed creates additional problems by attracting mice and other pests that feed on the ground.

Wire mesh feeders constructed of rigid steel wire are also well known to those skilled in the art of wild game feeding. The rigid steel wire mesh feeders are frequently used to hold blocks of suet or mixtures of seed, animal fat, peanut butter and the like. Although the rigid wire mesh feeders of the known art are resistant to chewing by squirrels and pecking by aggressive feeding birds, the rigid wire mesh feeders are not selectively collapsible for storage, shipment, etc. When the rigid wire mesh feeders are bent, dented, flattened or crushed, they cannot be expanded and reused without suffering metal fatigue and damage to their attachments, connections and welds.

In applicant's U.S. Pat. No. 6,073,582, a collapsible feeder is disclosed which has met with tremendous success. Although the commercial embodiment of the collapsible feeder disclosed in the '582 patent has met with considerable success, the capacity of the feeder is limited to approximately 3 to 3½ pounds of bird seed.

SUMMARY OF THE INVENTION

A collapsible, multi-tiered bird feeder is disclosed comprising a plurality of stacked collapsible bird feeders such as disclosed in U.S. Pat. No. 6,073,582 so as to provide a multi-tiered and collapsible bird feeder which has a very large capacity. Further, the multi-tiered bird feeder of this invention includes perches thereon as well as even feed baffle plates positioned therein which maintain a certain amount of feed thereabove, even though the main level of feed has dropped therebelow.

It is therefore a principal object of the invention to provide a multi-tiered bird feeder of the collapsible type.

Still another object of the invention is to provide a collapsible, multi-tiered bird feeder having an improved storage capacity for bird feed.

Yet another object of the invention is to provide a collapsible, multi-tiered bird feeder including even feed baffle plates positioned therein in a vertically spaced-apart manner to maintain a certain amount of bird feed thereabove, even though the main level of bird feed has fallen therebelow.

These and other objects will be obvious to those skilled in the art.

BRIEF DESCRIPTION OF THE DRAWINGS

FIG. 5 is a side schematic view of a 3-tier feeder of this invention;

FIG. 6 is a side schematic view of a 4-tier feeder of this invention;

FIG. 7 is a side schematic view of another 4-tier feeder of this invention;

FIG. 8 is a side schematic view of the 5-tier feeder of this invention;

FIG. 9 is a side schematic view of a 6-tier feeder of this invention;

FIG. 10 is a side schematic view of a 7-tier feeder; and

FIG. 11 is a side schematic view of an 8-tier feeder.

DETAILED DESCRIPTION OF THE INVENTION

Figure 1:
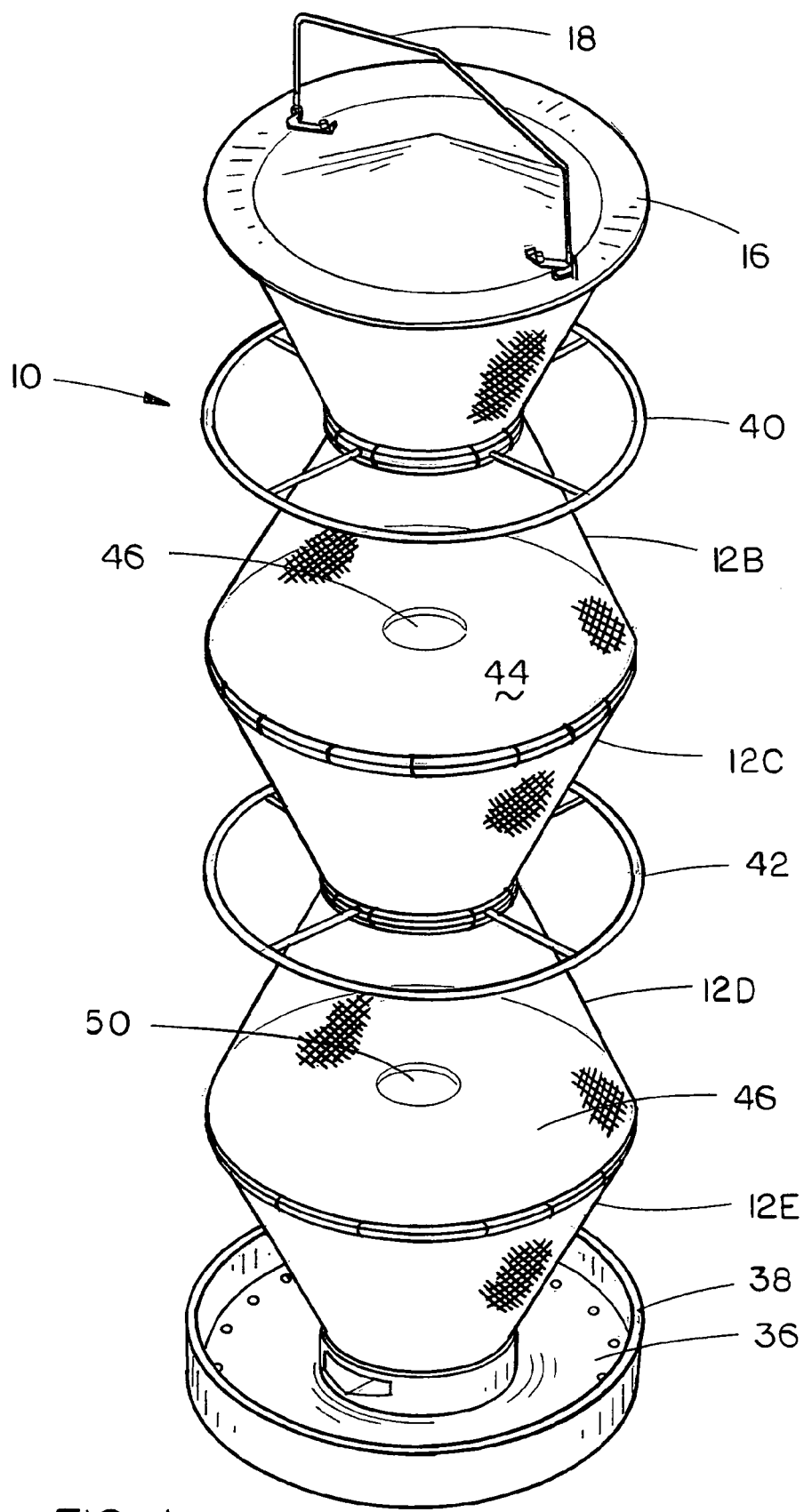
FIG. 1 is a perspective view of the multi-tier, collapsible feeder of this invention.
Figure 2:
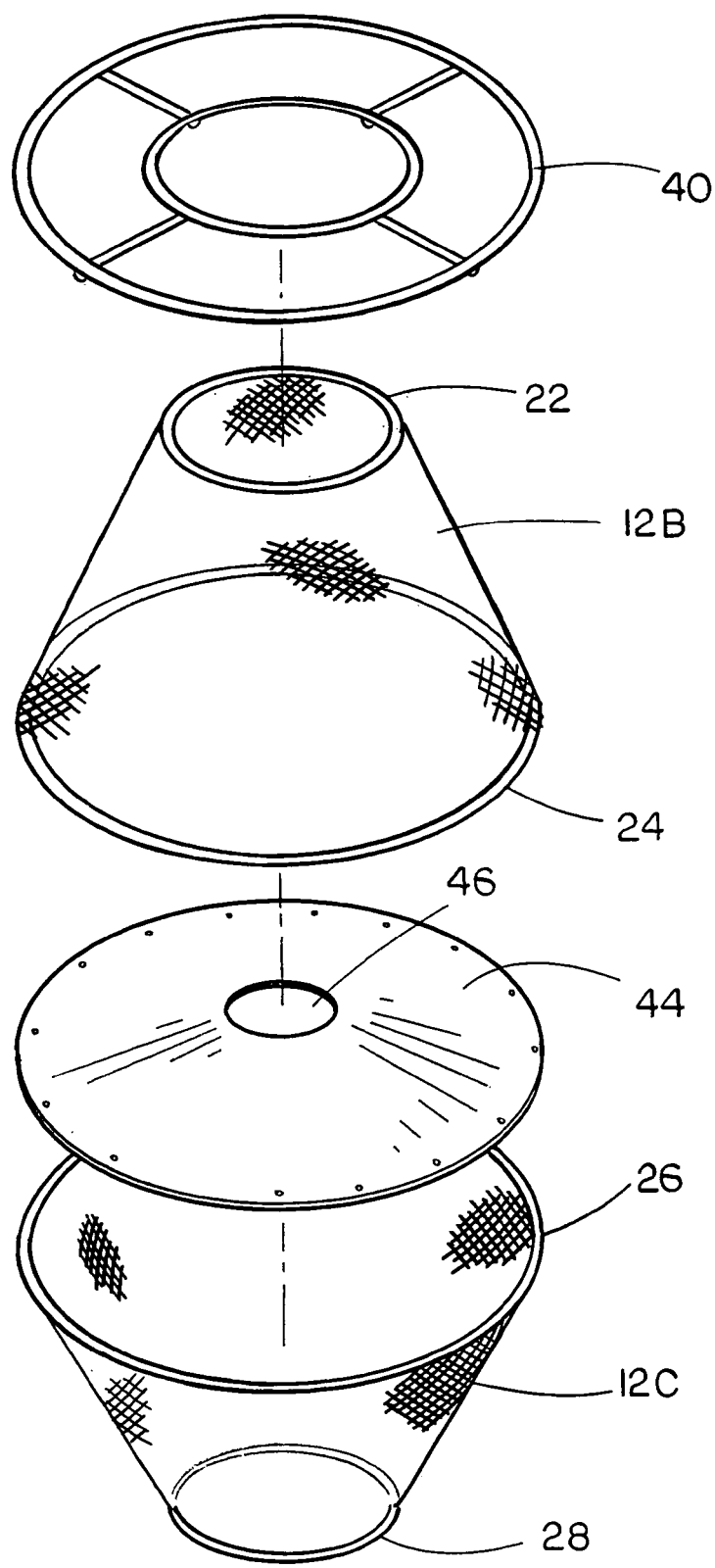
FIG. 2 is an exploded perspective view of a portion of the feeder of FIG. 1.

The 5-tier collapsible feeder of this invention is referred to generally by the reference numeral 10. Feeder 10 is comprised of a plurality of feeder bodies 12 such as disclosed in U.S. Pat. No. 6,073,582 but which are arranged in an alternating stacked fashion so as to provide a collapsible, multi-tiered bird feeder. The drawings of this invention illustrate a 5-tier bird feeder although any number of tiers could be utilized greater than one. See, for example, FIGS. 5–7 and 9–11 for examples of a 3-tier feeder 10A, a 4-tier feeder 10B, another 4-tier feeder 10C, a 6-tier feeder 10D, a 7-tier feeder 10E and an 8-tier feeder 10F.

The numeral 14 refers to a first ring-shaped support which is positioned at the upper end of the feeder 10 and which has a cover or lid 16 extending thereover to close the open upper end of the feeder. The numeral 18 refers to a hanger which is pivotally connected to the support 14. Feeder body 12A comprised an inverted, truncated, conical-shaped wall member which is secured at its upper end to the support 14 and which extends downwardly and inwardly therefrom. The numeral 20 refers to a second ring-shaped support which is secured to the lower end of the metal mesh wall of the feeder body 12A. A third ring-shaped support 22 is secured to the support 20 by any convenient means and has the upper end of a truncated, conical-shaped feeder body 12B secured thereto and which extends downwardly and outwardly therefrom. As in feeder body 12A, feeder body 12B is comprised of a metal mesh wall material.

A fourth support ring 24 is secured to the lower end of the feeder body 12B and has a fifth ring-shaped support 26 secured thereto by any convenient means. The upper end of feeder body 12C is secured to the support 26 and extends downwardly and inwardly therefrom. A sixth ring-shaped support 28 is secured to the lower end of feeder body 12C and has a seventh ring-shaped support 30 secured thereto by any convenient means. The upper end of a truncated, conical-shaped feeder body 12D is secured to the support 30 and extends downwardly and outwardly therefrom. An eighth ring-shaped support 32 is secured to the lower end of feeder body 12D and has a ninth ring-shaped support 34 secured thereto. The upper end of an inverted, truncated, conical-shaped feeder body 12E is secured to the support 34 and extends downwardly and inwardly therefrom. The lower end of the feeder body 12E has a tenth ring-shaped support 35 secured thereto which is secured to a base 36 including a rim 38.

An optional perch ring 40 is secured to the feeder at the juncture of the feeder bodies 12A and 12B. Similarly, an optional perch ring 42 is secured to the feeder at the juncture of the feeder bodies 12C and 12D, as seen in the drawings.

Figure 3:
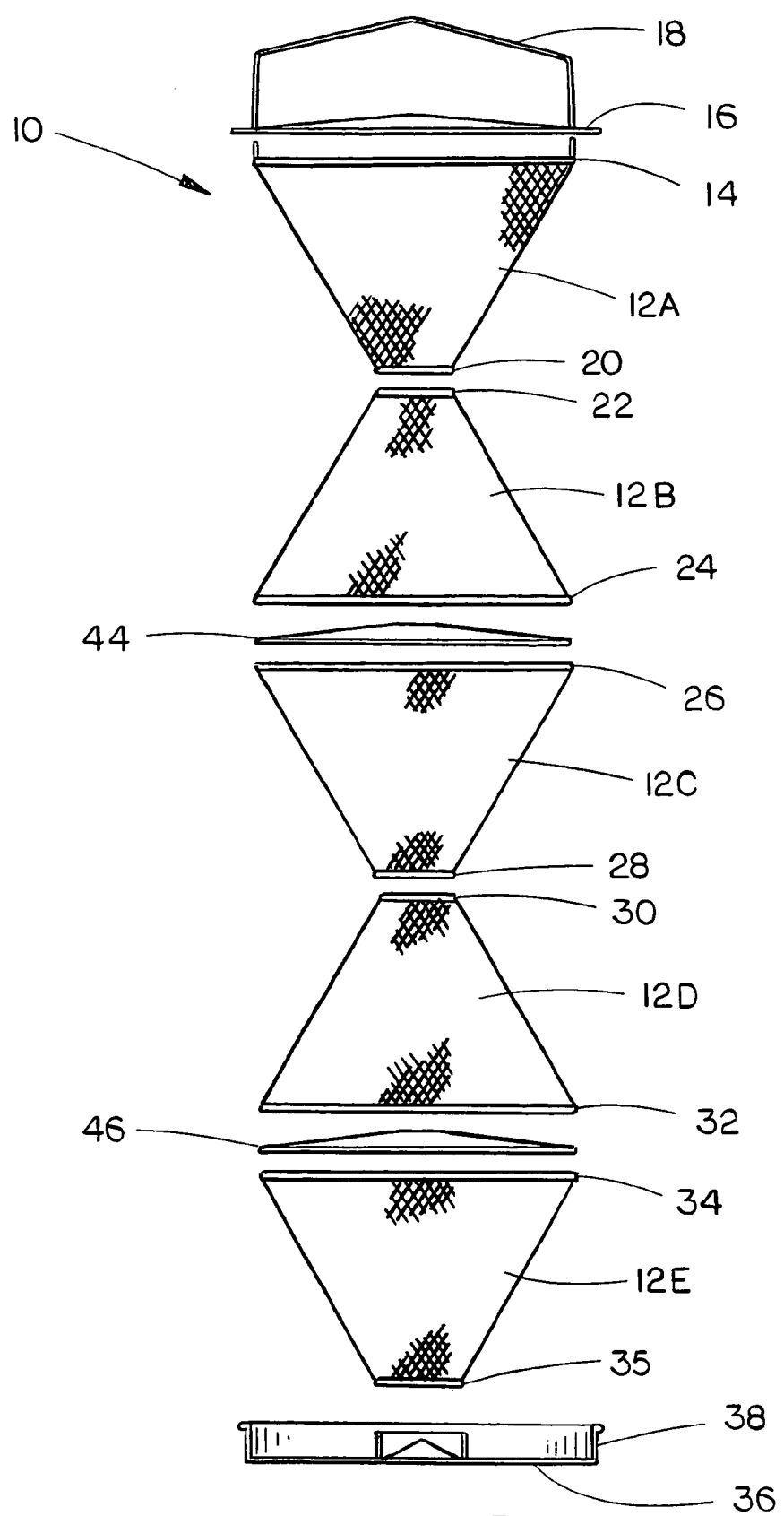
FIG. 3 is an exploded side view of a 5-tier feeder of this invention.

Preferably, an even feed baffle plate 44 is positioned between the lower end of feeder body 12B and the upper end of feeder body 12C. Baffle plate 44 has a central opening 46 formed therein to permit feed to pass therethrough. Preferably, the center of the baffle plate 44 is slightly raised with respect to the periphery thereof so as to define a somewhat conical-shape (FIG. 3). Similarly, an even feed baffle plate 46 is positioned between the lower end of feeder body 12D and the upper end of feeder body 12E and has a central opening 50 formed therein in an identical fashion to that of the baffle plate 44.

In use, the lid 16 is removed from the upper end of the feeder 10 and the hanger 18 is secured to a suitable support such as a branch, etc. Feed is poured into the feeder body from the open upper end of the feeder body 12A and passes downwardly into all of the feeder bodies. The central openings in the even feed baffle plates permit the feed to flow downwardly into the feeder bodies located therebelow.

Figure 4:
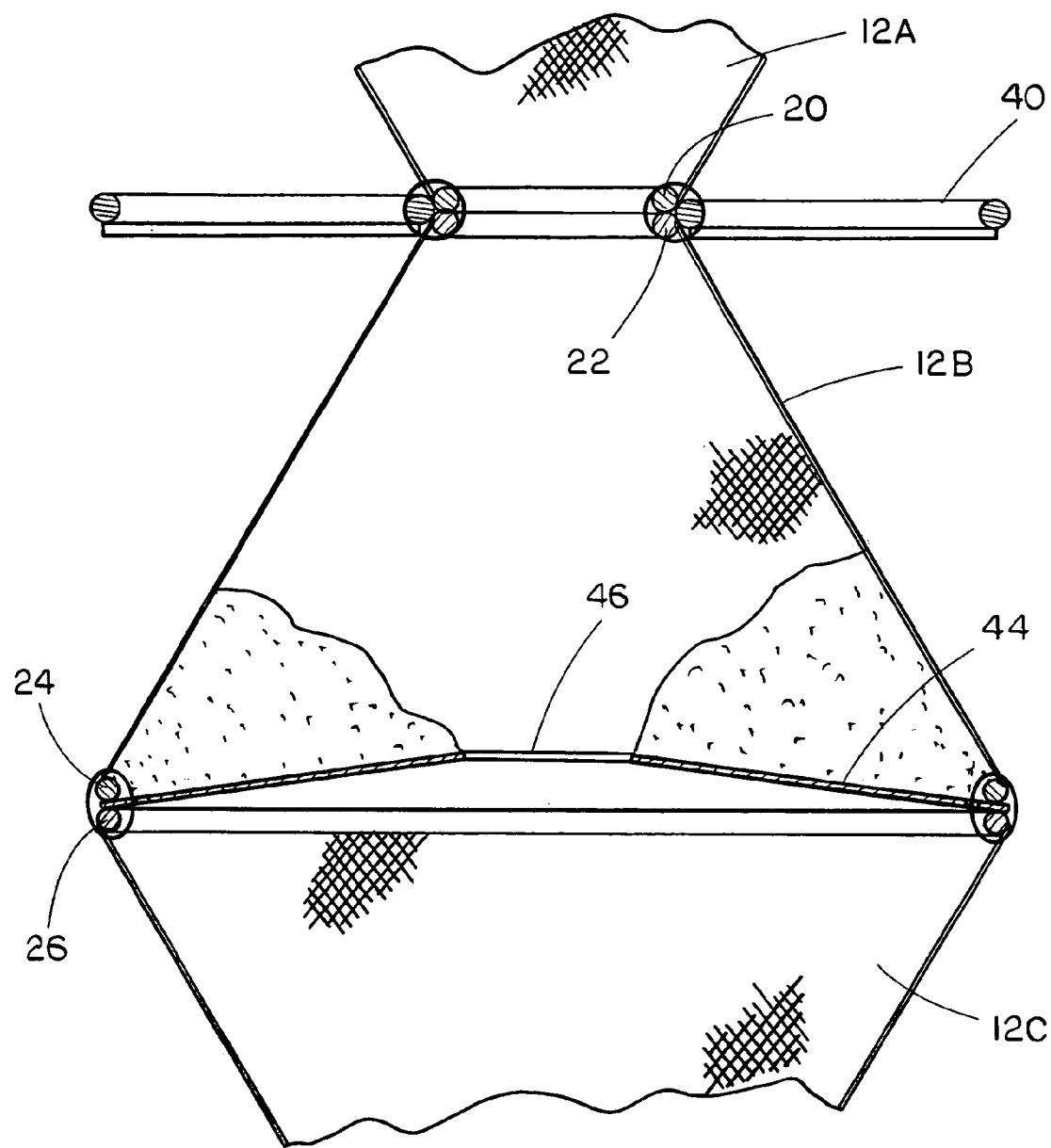
FIG. 4 is a partial side view of the feeder with portions thereof cut away to more fully illustrate the invention.

As the birds feed from the feeder 10, the main level of feed may drop below the upper baffle plate 44, but a certain amount of feed will be positioned thereabove outwardly of the central opening 46, as seen in FIG. 4, so that the birds may feed from the feeder body 12B, even though the main level of feed in the feeder has dropped therebelow. Similarly, as the feed level in the feeder drops below baffle plate 46, a certain amount of feed will remain on the upper end or upper surface of the baffle plate 44 outwardly of the opening 50 so that the birds may feed from the feeder body 12D.

The multi-tiered arrangement of the feeder bodies enables the feeder to have a very large capacity which does not require constant refilling. The multi-tiered feeder also provides a very large perching area together with the perch rings 40 and 42. Further, the birds may perch on the base or rim in conventional fashion.

When it is desired to store the feeder, the feeder is simply collapsed downwardly into the base 36 which makes it extremely small for shipping and transport purposes, as well as storage purposes.

As previously stated, FIGS. 1–4 and 8 illustrate a 5-tier feeder but that other numbered tiers may be utilized, as seen in FIGS. 5–7 and 9–11. FIG. 5 illustrates a 3-tier feeder; FIG. 6 illustrates a 4-tier feeder; FIG. 7 illustrates another 4-tier feeder; FIG. 9 illustrates a 6-tier feeder; FIG. 10 illustrates a 7-tier feeder; and FIG. 11 illustrates an 8-tier feeder. As seen in FIGS. 5, 6, 8 and 10, the uppermost feeder bodies have a truncated, cone shape while the uppermost feeders in FIGS. 7 and 9 have an inverted, truncated, cone shape. Further, some of the lowermost feeder bodies will have a truncated, cone shape (FIGS. 7–11) while some of the lowermost feeder bodies may have an inverted, truncated, cone shape (FIG. 6). The perch rings are preferred, but optional. Similarly, the base and rim construction at the lower end of the feeders is preferred, but optional.

Thus it can be seen that the invention accomplishes at least all of its stated objectives.

I claim:

1. A collapsible multi-tiered feeder, comprising:
   a first ring-shaped support defining a central feed fill opening;
   a cover member selectively positioned on said first ring-shaped support for selectively closing said central feed fill opening;
   a first inverted, truncated, cone-shaped collapsible metal mesh wall, having upper and lower ends;
   said upper end of said first metal mesh wall being secured to said first support and extending downwardly and inwardly therefrom;
   a second ring-shaped support secured to said lower end of said first metal mesh wall;
   a third ring-shaped support secured to said second ring-shaped support;
   a second truncated, cone-shaped collapsible metal mesh wall having upper and lower ends;
   said upper end of said second metal mesh wall secured to said third ring-shaped support and extending downwardly and outwardly therefrom;
   a fourth ring-shaped support secured to said lower end of said second metal mesh wall;
   a fifth ring-shaped support secured to said fourth ring-shaped support;
   a third inverted, truncated, cone-shaped collapsible metal mesh wall member having upper and lower ends;
   said upper end of said third metal mesh wall member being secured to said fifth support ring and extending downwardly and inwardly therefrom;
   a sixth ring-shaped support secured to said lower end of said third metal mesh wall member;
   a seventh ring-shaped support secured to said sixth ring-shaped support;
   a fourth truncated, cone-shaped collapsible metal mesh wall having upper and lower ends;
   an eighth ring-shaped support secured to said lower end of said fourth metal mesh wall;
   a ninth ring-shaped support secured to said eighth ring-shaped support;
   a fifth inverted, truncated, cone-shaped collapsible metal mesh wall having upper and lower ends;
   said upper end of said fifth metal mesh wall being secured to said ninth ring-shaped support and extending down and inwardly therefrom;
   a base and a rim;

said lower end of said fifth metal mesh wall being secured to said base;

said first, second, third, fourth and fifth metal mesh walls being movable between an extended position to a collapsed position.

2. The feeder of claim 1 wherein a perch ring is positioned at the juncture of at least some of said metal mesh walls.

3. The feeder of claim 1 wherein a first perch ring is positioned at the juncture of said first and second metal mesh walls and at the juncture of said third and fourth metal mesh walls.

4. The feeder of claim 1 wherein an even feed baffle is provided at the juncture of at least some of said metal mesh walls.

5. The feeder of claim 4 wherein said even feed baffle is disk-shaped with a central opening formed therein.

6. The feeder of claim 5 wherein said baffle is conical in shape.

7. The feeder of claim 1 wherein a first even feed baffle is provided at the juncture of said second and third metal mesh walls and a second even feed baffle is provided at the juncture of said fourth and fifth metal mesh walls.

8. The feeder of claim 7 wherein each of said first and second even feed baffles is disk-shaped with a central opening formed therein.

9. The feeder of claim 8 wherein each of said first and second even feed baffles is conical in shape.

10. A multi-tier feeder, comprising:

a plurality of mesh feeder bodies vertically stacked one upon the other in a collapsible fashion;

at least some of said feeder bodies having an even feed baffle plate positioned therebetween.

11. A multi-tier feeder comprising a plurality of vertically spaced-apart, inverted, truncated, cone-shaped collapsible mesh feeder bodies having vertically spaced-apart, truncated, cone-shaped collapsible mesh feeder bodies secured thereto and positioned therebetween in a vertical stacked fashion.

12. The multi-tier feeder of claim 11 wherein three to eight feeder bodies are stacked one upon the other.

* * * * *